United States Patent
Rouphael et al.

(10) Patent No.: US 7,092,438 B2
(45) Date of Patent: Aug. 15, 2006

(54) MULTILEVEL DECISION FEEDBACK EQUALIZER

(75) Inventors: Antoine J. Rouphael, Escondido, CA (US); Benny Vejlgaard, San Diego, CA (US); Thomas Klingenbrunn, San Diego, CA (US); Lichung Chu, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 686 days.

(21) Appl. No.: 10/057,466

(22) Filed: Jan. 22, 2002

(65) Prior Publication Data

US 2003/0138040 A1    Jul. 24, 2003

(51) Int. Cl.
*H04B 1/38* (2006.01)
*H04L 27/10* (2006.01)
*H04L 27/18* (2006.01)
*H04L 5/16* (2006.01)

(52) U.S. Cl. ........................... 375/233; 375/229
(58) Field of Classification Search ........... 375/233, 375/229
See application file for complete search history.

(56) References Cited

U.S. PATENT DOCUMENTS

| | | | |
|---|---|---|---|
| 5,027,369 A * | 6/1991 | Kuenast | 375/233 |
| 5,732,112 A * | 3/1998 | Langberg | 375/349 |
| 5,872,817 A | 2/1999 | Wei | |
| 6,307,884 B1 * | 10/2001 | Du et al. | 375/233 |
| 6,341,360 B1 * | 1/2002 | Abdelilah et al. | 714/704 |
| 6,816,548 B1 * | 11/2004 | Shiue et al. | 375/233 |
| 6,831,958 B1 * | 12/2004 | Rouvellou | 375/350 |
| 6,912,248 B1 * | 6/2005 | Wakabayashi | 375/229 |

FOREIGN PATENT DOCUMENTS

EP    0 889 612 A3    9/2000

* cited by examiner

*Primary Examiner*—Chieh M. Fan
*Assistant Examiner*—Jia Lu

(57) ABSTRACT

A method of processing a sequence of digital symbols comprises the steps of processing the sequence of digital symbols and determining an uncertainty in the processing. If the uncertainty exceeds a predetermined threshold, then the method further comprises the steps of processing at least two sequences of digital symbols wherein at least one parameter is set differently in each sequence, and deciding upon a calculated error for each sequence which sequence is used to generate an output signal.

42 Claims, 4 Drawing Sheets

MULTILEVEL DECISION FEEDBACK EQUALIZER

BACKGROUND OF THE INVENTION

The present invention relates generally to a decision feedback equalizer and in particular to a decision feedback equalizer using a multilevel Viterbi detector.

Wireless technology provides a plurality of applications for voice and/or data transmission. Today's cell phone networks offer a plurality of services for their customers including digital data services, such as, digital email, Internet access, etc. In future applications, such as third generation wireless networks, new digital data services will be provided. In particular, Internet applications will be highly improved and made more practical, for example, via high speed digital data transmission. Other digital data applications, not yet applicable in today's wireless transmission technology, will be adapted and implemented.

High speed wireless data application require high data throughput at a significantly lower bit error rate than voice applications. Bit errors in voice applications are usually easy to recover or do not need to be fully recovered due to redundancy capabilities of the human ear; whereas, digital data applications often highly rely on the correctness of the submitted data. The quality of data transmissions in a digital environment highly depends on the quality of the transmission channel. Under severe channel conditions, the mobile device throughput is markedly affected due to retransmission of erroneous data packets, thus affecting the entire network throughput. This situation may be ameliorated by the use of antenna diversity and more sophisticated signal processing algorithms.

According to the prior art, decision feedback equalizers are used to compensate for the effects of the transmission channel, which can vary depending on the environment. A basic decision feedback equalizer (DFE) consists of a forward filter, a feedback filter, and a decision device. Decision feedback equalizers are effective against severe intersymbol-interference. Intersymbol-interference is an effect that creates distortion of the transmitted signal in a specific way. In a sequence of positive and negative symbol pulses, intersymbol-interference is the distortion of a symbol pulse within a particular symbol period caused by the smearing or spillover of symbol pulses of preceding and/or succeeding adjacent symbol pulses into the particular symbol period. The spillover of the preceding and/or succeeding symbol pulses will add to or subtract from the symbol pulse in the particular symbol interval depending upon whether the adjacent interfering symbol pulses are positive or negative in value. In applications with mobile devices, intersymbol-interference occurs due to the multi-path profile of the mobile channel as well as the above mentioned smearing generated due to analog filtering. Unlike in linear equalizers, decision feedback equalizer's decision errors propagate in the feedback branch thus affecting the outcome of future bit decisions.

It is therefore desirable to provide an arrangement for a decision feedback equalizer which is highly suitable for high speed wireless data applications.

SUMMARY OF THE INVENTION

According to a specific embodiment, the invention provides a method of processing a sequence of digital symbols. The method includes the steps of processing the sequence of digital symbols and determining an uncertainty in the processing. If the uncertainty exceeds a predetermined threshold, the method processes at least two sequences of digital symbols wherein at least one parameter is set differently in each sequence and decides upon a calculated error for each sequence which sequence is used to generate an output signal.

According to another exemplary specific embodiment, the present invention provides a method of processing a sequence of digital symbols. The method includes the steps of processing the sequence of digital symbols and calculating an uncertainty. If the uncertainty exceeds a predefined threshold, the method performs the steps of processing at least two sequences of digital symbols each having at least one parameter different from the other, calculating an error for each sequence and deciding upon the calculated error which sequence is used to generate an output signal.

A more complete understanding of various specific embodiments of the present invention and advantages thereof may be acquired by referring to the following description taken in conjunction with the accompanying drawings, in which like reference numbers indicate like features.

DETAILED DESCRIPTION OF SPECIFIC EMBODIMENTS

The embodiments of the present invention are directed to decision feedback equalizers for processing a sequence of digital symbols. A first exemplary embodiment can be implemented in a wireless mobile and/or stationary device and comprises a first feedback equalizer and a second feedback equalizer. The first feedback equalizer is for generating a first output signal, for calculating an uncertainty value, and for generating a first error signal receiving the sequence of digital symbols. The second feedback equalizer is for generating a second output signal and for generating a second error signal receiving the sequence of digital symbols. A first and second error processing unit receives first and second error signals and generates first and second error values. A decision device receives the first and second error values and generates a control signal controlling a switching unit for selecting the first or second output signal.

Figure 1:
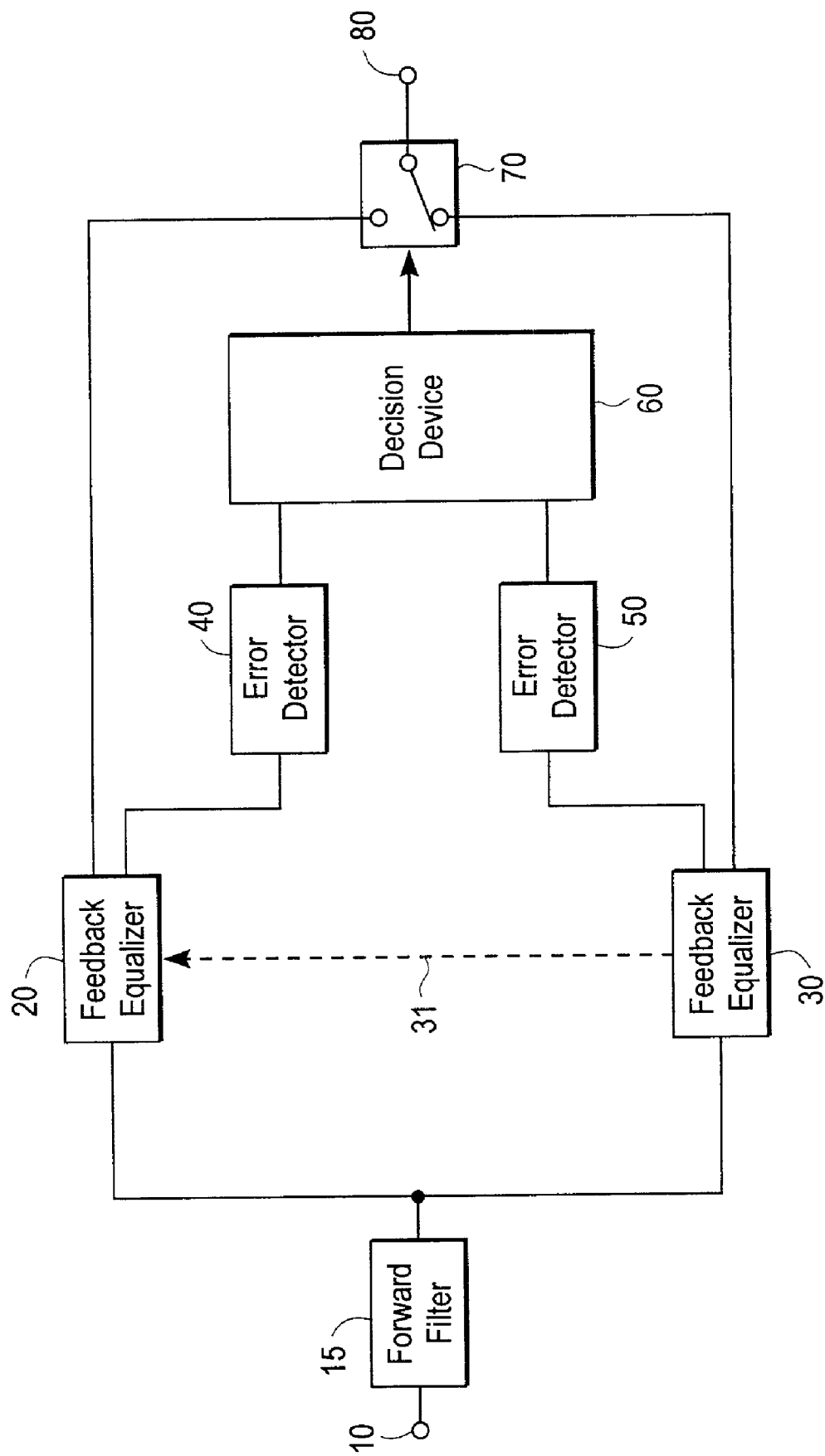
FIG. 1 shows a block diagram of an arrangement according to the present invention depicting the principles of the present invention.

FIG. 1 shows a general block diagram according to the present invention. The input signal, present at terminal 10, will be considered as a real baseband signal received from a transmitter in a wireless environment. Such an input signal can be any complex signal with a quadrature amplitude modulation having I and Q components. Such a signal r can be expressed in a simple model as:

$$r_k = x_k \cdot h_k + n_k \tag{1}$$

where $r_k$ is the transmitted signal consisting of the transmitted real valued symbol $x_k$, which is transformed through the channel by function $h_k$ and to which a white Gaussian noise $n_k$ is added. The real valued symbol $x_k$ is actually the digital representation of an analog signal. The value $r_k$ is evaluated within a decision feedback equalizer. Typically the ideal representation in a binary phase shift key (BPSK) of a symbol value of a digital zero is "−1" and that of a digital one is "1". However, transmission channel influences and noise falsify the original transmitted signal as shown in equation (1) and make the decision more difficult. If the value of the $r_k$ symbol crosses a certain threshold during the decision process, the uncertainty in the decision whether the symbol represents a digital zero ("−1") or a digital one ("1") increases. Under certain circumstances, no reliable decision is possible. Therefore, filters are used within the receiver to compensate for the effects of the transmission channel on the real valued symbol $x_k$.

Figure 5:
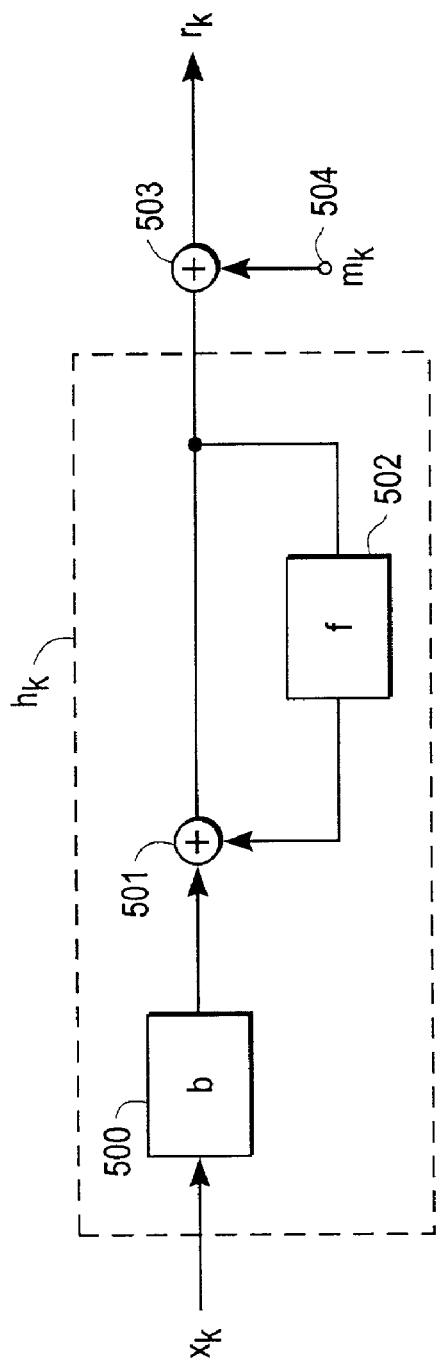
FIG. 5 shows an equivalent block diagram representing the transmission channel characteristics.

FIG. 5 shows an equivalent block diagram of the effects of a typical transmission channel. The transmitted symbol $x_k$ is fed to a first filter 500 (equivalent to the feedback filter in the receiver) whose output is fed to a first adder 501. A second filter 502 (equivalent to the forward filter in the receiver) receives the output signal of the adder 501 and generates an output signal fed to the second input of adder 501. An additional adder 503 adds white noise 504 to the resulting output signal to output $r_k$ as shown in equation (1).

According to an exemplary embodiment of the present invention, FIG. 1 shows a block diagram where numeral 10 indicates a terminal which receives signal $r_k$. After being filtered by forward filter 15, signal $r_k$ is fed to the input of a first feedback equalizer 30 and of a second feedback equalizer 20. Each feedback equalizer 30 and 20 provides a first output signal which represents the digital bit values and a second output signal which represents an uncertainty of the decision made. Each error processing unit 50 and 40 receives from then on error values and processes and accumulates them over time. Thus, for example, a mean square error is calculated. A decision device 60 receives the mean square errors and controls a switch 70 receiving the digital output values from feedback equalizers 30 and 20. The switch is controlled to pass the output signal of either feedback equalizer 30 or 20 to an output terminal 80 which carries the decoded digital bit signal.

As will be explained later in more detail, during normal operation only one branch, e.g. feedback equalizer 30, is operative. However, a certain valued mean square error can trigger activation of at least second feedback equalizer 20, indicated through dotted line 31. Instead of a mean square error value triggering this event (connection between error detectors and activation of at least a second feedback equalizer is not shown in FIG. 1), a certain threshold value can trigger this event. For example, if a number of consecutive errors is above a certain threshold number, this split can be initiated. This threshold number can be dependent on the structure of the feedback equalizer. Once the split is initiated, the two or more equalizers operate in parallel until the decision device finally decides which branch will be used in a further operation.

To counter the effects of the transmission channels, usually a decision feedback equalizer comprises a forward filter which receives the received signal $r_k$ and a feedback filter which is implemented in a feedback loop of the slicer. A slicer receives the output signal of the forward filter minus the output of the feedback filter. The slicer is the device which actually determines the digital value of a symbol. Depending on the input signal, a certain error or uncertainty within the slicer occurs. Thus, for example, when the received signals $r_k$ are unambiguous the feedback loop will create no feedback value. If there exists an ambiguity, the system can, for example, calculate a mean square error or count the number of consecutive ambiguous symbols, wherein a threshold defines whether a symbol is ambiguous or not. Any other possible error evaluation can be used.

As seen in FIG. 1, a single forward filter 15 (shown) is implemented immediately after terminal 10 and the output of this filter is coupled with the input of both feedback equalizers 30 and 20. Alternatively, each feedback equalizer 20 and 30 can, for example, implement its own forward filter (not shown) between terminal 10 and itself. Furthermore, multiple feedback equalizers can be used in parallel. In this illustrated embodiment, however, only two feedback equalizers are shown for a better overview of the general principle of the present invention.

According to one embodiment, feedback equalizers 30 and 20 are implemented such, that their decision is at least at some point processed differently. For example, in a multi-stage slicer an evaluation whether a symbol is a "−1" or a "1" can be made at a certain stage or at a plurality of stages as will be explained later in more detail in conjunction with a Viterbi detector. However if the value is getting closer to "0" it is unclear whether it is an actual "−1" or a "1", representing a digital zero or a digital one, respectively. This uncertainty triggers the following split data processing. From then on, both equalizers 30 and 20 operate slightly differently. The first equalizer 30 will decide at this point to use a "−1" and the other equalizer 20 will decide to use a "1". The equalizers 30 and 20 will generate their respective errors which will influence the further operation of the respective equalizer 30 and 20. The trigger to start a new evaluation is indicated in FIG. 1 as arrow 31. In this embodiment equalizer 30 sends a control signal to equalizer 20 to proceed with a different decision. Furthermore, error processing units 50 and 40 are reset to generate new mean square error values for a predetermined amount of error values. When those mean error values are calculated, decision device 60 determines which equalizer should be used from then on based on the lowest mean square error. Switch 70 then selects the respective channel.

In another embodiment, such as a digital implementation, only one equalizer operates and processes the incoming symbol stream until the error threshold is reached. Again, the error threshold can be derived from the mean square error or by counting consecutive symbols whose ambiguity is above a certain ambiguity threshold or any other suitable error detection. Once a split decision is made, two or more equalizers operate in parallel as described above. During the time the mean square error or any other suitable error is calculated, the output signal stream of the parallel processing equalizers can be buffered. Once a decision is made, the respective buffer is selected and only the selected equalizer remains operating and becomes the selected equalizer. The procedure repeats if the error threshold is reached again.

In a different embodiment, such as a "hardware" embodiment as shown in FIG. 1, two or more equalizers can operate in parallel. Instead of the above decision criteria which triggers the equalizer "splitting", the feedback equalizers might be implemented in an adaptive manner. During normal operation the parallel operating equalizers operate in the same way generating the same mean square errors. When the mean square error reaches a predefined threshold, slightly or substantially different parameters could be used for the feedback filters or for the slicers of the equalizers. From this time on, the equalizers operate in a different way until a decision has been made. Once the decision has been made, the parameters of the selected feedback equalizer are transferred to the other equalizers through path 31 and both process the symbol stream in the same manner again.

The slicer in all embodiments can be a standard slicer as used in decision feedback equalizers or a Viterbi detector (as will be explained later in more detail) or any other suitable determination unit. In a "hardware" implementation, the point where the signal is split is determined by the point within the calculation path or processing chain which will use different parameters after the trigger event. Thus, up to this point only one single processing/calculation chain has to be implemented. Therefore, parts of feedback equalizers 20 and 30 can be implemented only once and serve/feed both feedback equalizers in "hardware" solutions.

The feedback equalizers generate a feedback value consisting of the filtered slicer output, namely $a_k \times b$, which is then subtracted from the input value. The slicer receives an input value $d_k$ which is the filtered version of the received symbol $r_k$ minus the feedback value $a_k \times b$. The absolute difference between value $d_k$ and the actual output value $a_k$ of the feedback equalizer determines the error value for this particular symbol. Error processing units 40 and 50 calculate, for example, a square mean error over time. Initially, although the parallel operating equalizers operate in the same way and generate the same error values, one of the processing paths is pre-selected. In the exemplary embodiments, this path is the feedback equalizer 30 and error processing unit 50. The uncertainty of the decision is determined by a threshold value within the active path or by the number of consecutive ambiguous symbols or any other suitable detection. Once this threshold is exceeded, a new selection procedure is started. The uncertainty value can also control the output of the error values. For example, no error values can be output as long as the uncertainty threshold has not been exceeded. As mentioned above, each equalizer can operate with the same parameters and just differ in a single parameter. The parameter can be the decision itself, namely the decision which was uncertain. Equalizer 30 may, for example continue its symbol evaluation with a first decision while equalizer 20 continues with the opposite decision. Both equalizers continue to operate from thereon as before. However the generated error will propagate in different ways in both equalizers 30 and 20 and result at some time in different mean square errors. With more than two equalizers operating in parallel a plurality of different error values, such as a mean square errors, will be generated. Decision device 60 determines over a predetermined time period the mean square error values of error processing units 40 and 50. After the predetermined time, decision device 60 selects the feedback equalizer 20 or 30 depending on which one generates a lower mean square error (or in case of multiple feedback equalizers, the one generating the lowest mean square error). A respective control signal generated by the decision device controls switch 70 to select the output signal of the respective feedback equalizer.

To improve signal quality, feedback equalizers 30 and 20 can include a buffer for the generated output signals. The buffer size is proportional to the decision time. In other words, the buffer stores as many output values as are necessary to determine a respective error value, such as a mean square error value. By switching from one buffer to another buffer, fewer erroneous values are transferred from the respective feedback equalizer. For example in a two equalizer embodiment, if both equalizers start generating uncertain output values, a specific decision is made differently in the equalizers, or a parameter is shifted in one of the equalizers, thus starting a new decision procedure. During the decision time, a plurality of erroneous values could be stored in the buffer of the selected feedback equalizer; whereas, the other feedback equalizer might have generated error-free or less erroneous values. By switching from one buffer to the other buffer, it will be ensured that the most accurate values are transferred. This scheme can be easily expanded to a multi-split path using multiple parallel feedback equalizers each working with a different set of parameters.

Figure 2:
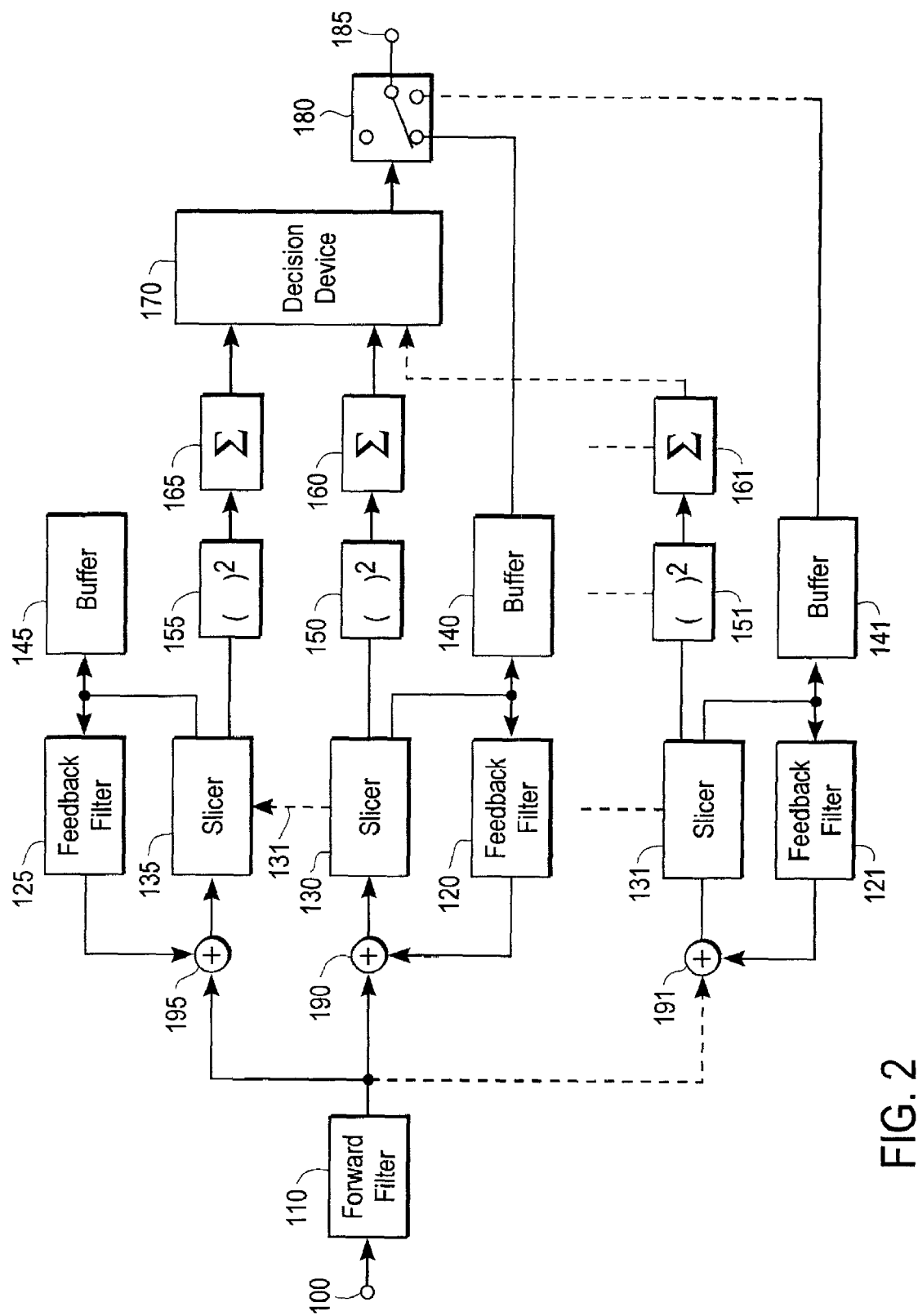
FIG. 2 shows a block diagram of a first exemplary embodiment according to the present invention.

FIG. 2 shows a more detailed exemplary embodiment according to the present invention using a multiple split path. Terminal 100 carries the digitized symbols received, amplified, and converted by the antenna and following analog/digital circuitry. This symbol sequence $x_k$ is fed to the input of a forward filter 110. The output signal is fed to the first input of adders 190, 191 and 195. Additional paths can be implemented as indicated by the dotted lines. The output of adders 190, 191 and 195 are coupled with the inputs of slicer 130, 131 and 135, respectively. Each slicer 130, 131 and 135 generates an output signal which is fed to the input of feedback filters 120, 121 and 125, respectively. The output of feedback filters 120, 121 and 125 are coupled with the second input of the adders 190, 191 and 195, respectively. Furthermore, the output signals of slicer 130, 131 and 135 are fed to the input of buffers 140, 141 and 145, respectively, whose outputs are coupled with respective inputs of switch 180. Each slicer 130, 131 and 135 generates an error value for each determination, and each generated error value is fed to square unit 150, 151 and 155, respectively. The output of square units 150, 151 and 155 is fed to averaging unit 160, 161 and 165, respectively, each of which generates a mean square error value out of the sequence of squared error values. Any other error evaluation unit can be used. The output signals of the averaging units 160, 161 and 165 are fed to a decision device 170 which generates a control signal that controls switch 180. Thus, a terminal 185 is coupled with the output of either buffer 140, 141 or 145 through switch 180.

The input signal for slicers 130, 131 and 135 can be defined as:

$$d_k = r_k f - a_k b \tag{2}$$

where $r_k$ is the received symbol, f is the forward filter, b is the feedback filter, and $a_k$ is the output of the slicer. The forward filter is a N-Tap filter and the feedback filter in this embodiment is a M-tap filter. Therefore, the filter and output symbols can be defined as vectors:

$$f = [f_0, f_1, f_2, \ldots f_{N-1}] \tag{3}$$

$$b = [b_0, b_1, b_2, \ldots b_{M-1}] \tag{4}$$

$$a_k = [a_k, a_{k-1}, \ldots, a_{k-M+1}] \tag{5}$$

Thus, the error is defined as $$e_k = \sqrt{|d_k - a_k|} \tag{6}$$

This error drives the adaptation of the decision feedback equalizers. The adaptive forward and backward filter coefficient can be altered dynamically, for example, during the decision directed mode (e.g., preamble, midamble, Sync, etc.). This mode is a so-called training mode and is usually part of each transmitted packet or burst. It consists of a symbol sequence which is known and is placed within a packet or burst at predefined locations. Thus, the receiver knows the result and can therefore alter its filter values to adapt to the respective transmission conditions.

Figure 3:
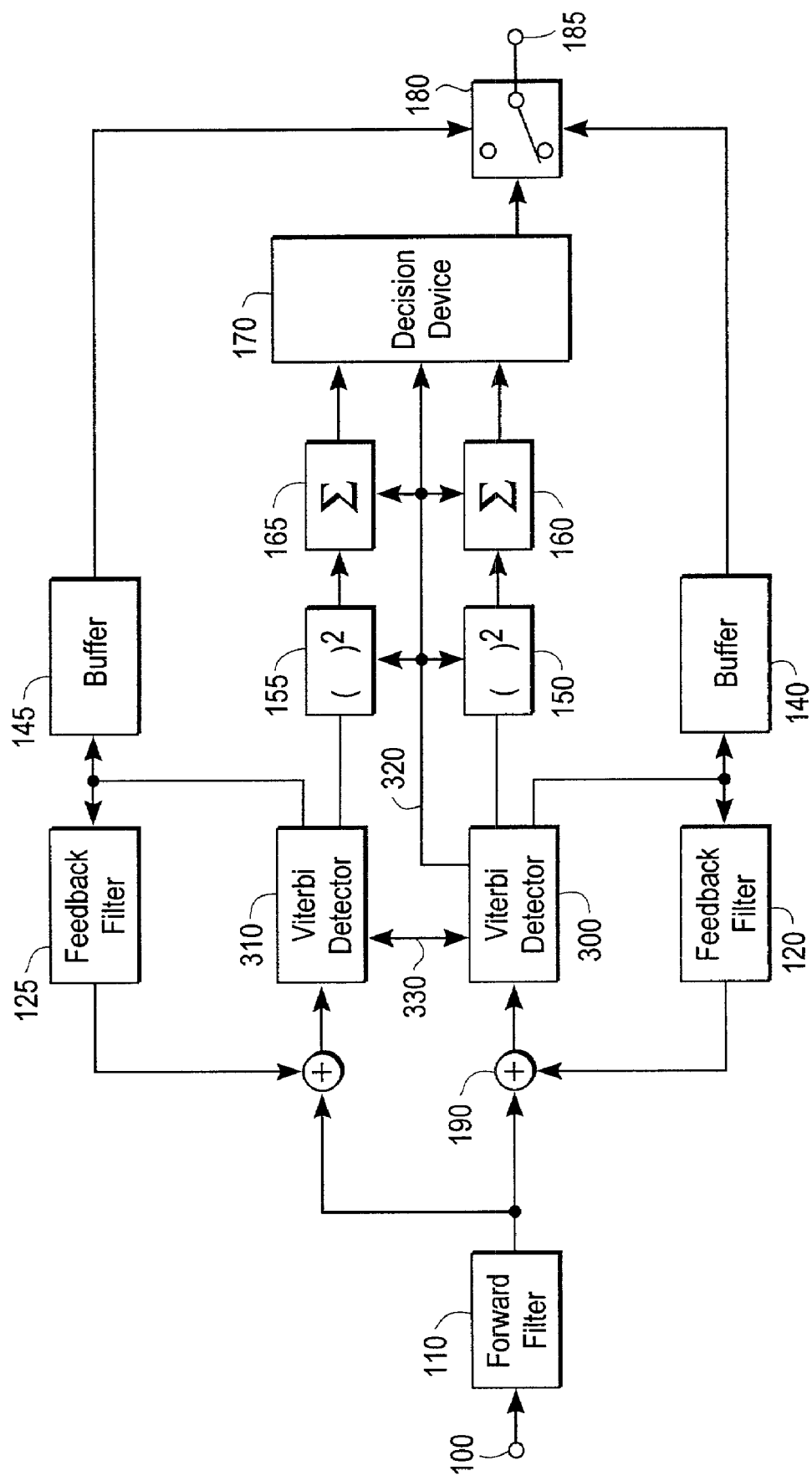
FIG. 3 shows a block diagram of another exemplary embodiment according to the present invention.

FIG. 3 shows a similar arrangement as that of FIG. 2 except using a two-way split path and with the slicers 130 and 135 replaced by Viterbi detectors 300 and 310. All other elements remain the same. The replacement of the slicer by a Viterbi detector in the decision feedback equalizers serves to better exploit the intersymbol interference energy in the post cursor symbols because a higher probability of predicting more accurate tail bits is given, thus increasing the chance to produce an accurate modeling of the post cursor.

The coupling 330 indicates the possibility of a parameter exchange after a selection has been finished. The exchange can operate in both ways depending on which Viterbi detector was selected. Control line 320 is used to transmit a reset signal to the decision device 170 and the error units 150, 160 and 155, 165 after a selection has been finished. Again, the selection or split can be based on the number of consecutive ambiguous symbols.

As mentioned above, the embodiments of FIGS. 2 and 3 can be implemented in hardware or in software. The software solution needs to process data only for one equalizer, e.g., equalizer 130 until the error threshold, e.g., the number of consecutive ambiguous values or any other suitable threshold value is exceeded. This event will trigger a new decision procedure during which two or more equalizers can be implemented. The difference between the equalizers can be only the triggering event, for example, the decision of an uncertain symbol which is executed in different ways in the split equalizers or the shifting/altering of one or more parameters. Once a decision has been made, only the selected equalizer is used until the next event occurs.

Figure 4:
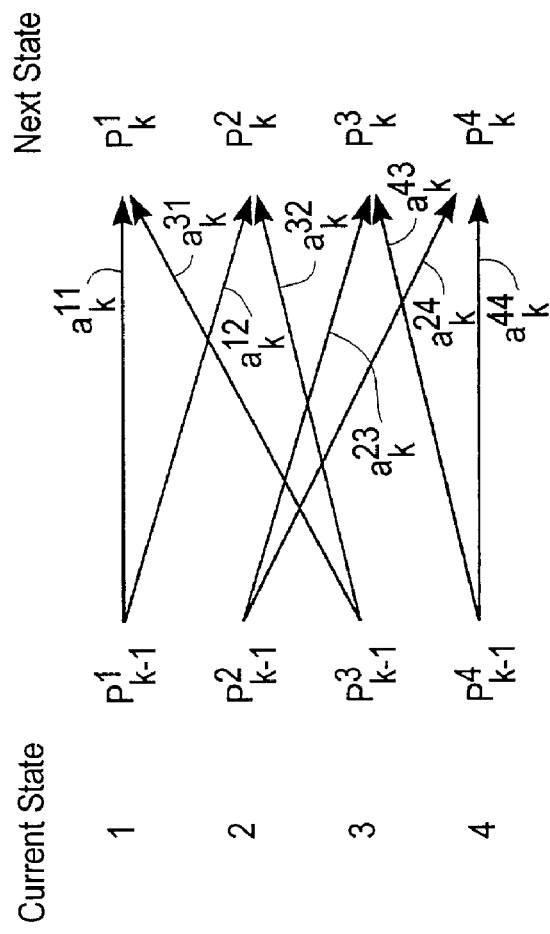
FIG. 4 shows more details of a suitable Viterbi detector.

FIG. 4 shows a 4-state Viterbi detector suitable for one of the above described embodiments. A Viterbi detector recreates a sequence of symbols by calculating the likelihood for all possible sequences. The sequence which gives the best fit between the real received sequence and the recreated sequence is then selected. A sequence is given as:

$$r_k = \sum_{i=1}^{L} a_{k-i} h_i + n_k \qquad (7)$$

where $r_k$ (k=1 ... N) is the known received signal and $h_i$ (i=1 ... L) are the known channel coefficients and $a_k$ (k=1 ... N) are the unknown transmitted symbols and nk (k=1 ... N) is the unknown white Gaussian noise. FIG. 4 shows the functionality of a 4-state Viterbi detector. The current state represents the sequence of two symbols, namely $a_{k-2}$ and $a_{k-1}$. Therefore, four possible sequences are depicted by numerals 1–4. For the next state, eight sequences are possible which are reduced to four possible states by means of a minimum decision. The minimum decision selects the path with the lowest branch metric. Thus, the likelihoods $p_k$ are defined as:

$$p_k^1 = \min(p_{k-1}^1 + b_k^{11}, p_{k-1}^3 + b_k^{31}) \qquad (8)$$

$$p_k^2 = \min(p_{k-1}^2 + b_k^{12}, p_{k-1}^3 + b_k^{32}) \qquad (9)$$

$$p_k^3 = \min(p_{k-1}^2 + b_k^{23}, p_{k-1}^4 + b_k^{43}) \qquad (10)$$

$$p_k^4 = \min(p_{k-1}^2 + b_k^{24}, p_{k-1}^4 + b_k^{44}) \qquad (11)$$

wherein $$b_k^{xy} = r_k - (a_{k-2}^x h_3 + a_{k-1}^x h_2 + a_k^{xy} h_1) \qquad (12)$$

$p_k^x$ represents the survivor path for the k'th symbol in the respective state x and $b_k^{xy}$ is the branch metric between state x and state y for the k'th symbol. Thus, a Viterbi detector is able to calculate the most likely next symbol in a sequence of symbols. The results of former calculations will influence the current decision as can be seen from the above equations. Although FIG. 4 shows a 4-state Viterbi detector, any kind of Viterbi detector can be used.

Furthermore, the present invention is described with exemplary embodiments that show either two or three decision equalizer paths or the splitting of a single decision equalizer into two decision equalizers. Depending on the used slicer, for example, a 4 or 8-state Viterbi detector, the splitting into more decision equalizers might be better to get more accurate results.

What is claimed is:

1. A decision feedback equalizer for processing a sequence of digital symbols comprising:
    a first feedback equalizer for generating a first output signal, for calculating an uncertainty value and for generating a first error signal receiving the sequence of digital symbols;
    at least a second feedback equalizer, which is designed to be only activated depending on said first error signal, for generating a second output signal and for generating a second error signal receiving the sequence of digital symbols;
    first and second error processing units receiving first and second error signals and generating a first and second error value;
    a decision device receiving the first and second error values and generating a control signal; and
    a switching unit controlled by the control signal for selecting the first or second output signal.

2. The decision feedback equalizer according to claim 1, further comprising:
    a forward filter receiving the sequence of digital symbols and generating an output signal;
    an adder receiving the forward filter output signal and a feedback output signal for generating an adder output signal;
    a slicer receiving the adder output signal and generating a slicer output signal; and
    a feedback filter receiving the slicer output signal for generating the feedback output signal.

3. The decision feedback equalizer according to claim 1, further comprising:
    a forward filter receiving the sequence of digital symbols and generating an output signal, wherein each decision feedback equalizer comprises:
    an adder receiving the forward filter output signal and a feedback output signal for generating an adder output signal;
    a slicer receiving the adder output signal and generating a slicer output signal; and
    a feedback filter receiving the slicer output signal for generating the feedback output signal.

4. The decision feedback equalizer according to claim 2, wherein each feedback equalizer comprises a buffer memory for storing the slicer output signal.

5. The decision feedback equalizer according to claim 3, wherein each feedback equalizer comprises a buffer memory for storing the slicer output signal.

6. The decision feedback equalizer according to claim 3, wherein the slicer is a Viterbi detector.

7. The decision feedback equalizer according to claim 1, wherein the decision device starts a decision process upon a predefined number of consecutive ambiguous decisions.

8. The decision feedback equalizer according to claim 7, wherein each feedback equalizer comprises a plurality of parameters and at least one parameter of the first feedback equalizer is set differently after starting the decision process.

9. The decision feedback equalizer according to claim 8, wherein after selection of the first or second output signal, the at least one parameter of the feedback equalizer is transferred to the other feedback equalizer.

10. The decision feedback equalizer according to claim 3, wherein the forward filter and the feedback filters are adaptive.

11. The decision feedback equalizer according to claim 1, further comprising a plurality of feedback equalizers and associated error processing units.

12. A mobile unit comprising a receiver for receiving digital data, wherein the receiver comprises a decision feedback equalizer for processing a sequence of digital symbols having:
- a first feedback equalizer for generating a first output signal, for calculating an uncertainty value and for generating a first error signal receiving the sequence of digitsl symbols;
- at least a second feedback equalizer, which is designed to be only activated depending on said first error signal, for generating a second output signal and for generating a second error signal receiving the sequence of digital symbols;
- first and second error processing units receiving first and second error signals and generating a first and second error value;
- a decision device receiving the first and second error values and generating a control signal; and
- a switching unit controlled by the control signal for selecting the first or second output signal.

13. A mobile unit according to claim 12, wherein the feedback equalizer comprises:
- a forward filter receiving the sequence of digital symbols and generating an output signal;
- an adder receiving the forward filter output signal and a feedback output signal for generating an adder output signal;
- a slicer receiving the adder output signal and generating a slicer output signal; and
- a feedback filter receiving the slicer output signal for generating the feedback output signal.

14. A mobile unit according to claim 12, further comprising:
- a forward filter receiving the sequence of digital symbols and generating an output signal, wherein each feedback equalizer comprises:
- an adder receiving the forward filter output signal and a feedback output signal for generating an adder output signal;
- a slicer receiving the adder output signal and generating a slicer output signal; and
- a feedback filter receiving the slicer output signal for generating the feedback output signal.

15. A mobile unit according to claim 13, wherein each feedback equalizer comprises a buffer memory for storing the slicer output signal.

16. A mobile unit according to claim 14, wherein each feedback equalizer comprises a buffer memory for storing the slicer output signal.

17. A mobile unit according to claim 14, wherein the slicer is a Viterbi detector.

18. A mobile unit according to claim 12, wherein the decision device starts a decision process upon a predefined number of consecutive ambiguous decisions.

19. A mobile unit according to claim 18, wherein each feedback equalizer comprises a plurality of parameters and at least one parameter of the first feedback equalizer is set differently after starting the decision process.

20. A mobile unit according to claim 19, wherein after selection of the first or second output signal, the at least one parameter of the feedback equalizer is transferred to the other feedback equalizer.

21. A mobile unit according to claim 14, wherein the forward filter and the feedback filters are adaptive.

22. A mobile unit according to claim 12, further comprising a plurality of feedback equalizers and associated error processing units.

23. A method of processing a sequence of digital symbols comprising the steps of:
- processing the sequence of digital symbols in a single equalizer;
- determining an uncertainty in the processing, and continuing to process the sequence of digital symbols into a single output sequence if the uncertainty is below or equal a predefined threshold; and
- if the uncertainty exceeds a predetermined threshold:
- activating at least a second equalizer thereby processing at least two sequences of digital symbols wherein at least one parameter is set differently in each sequence; and
- deciding upon a calculated error for each sequence which sequence is used to generate an output signal.

24. A method according to claim 23, further comprising the steps of filtering the digital symbols through a forward filter prior to processing the sequence.

25. A method according to claim 24, wherein the step of processing the digital symbols comprises the steps of:
- adding a feedback signal to the filtered signal;
- applying the added signal to a slicer; and
- filtering the output signal of the slicer through a feedback filter to generate the feedback signal.

26. A method according to claim 25, wherein the slicer is a Viterbi detector.

27. A method according to claim 23, wherein the step of deciding which processing path is selected is activated by an error threshold.

28. A method according to claim 27, further comprising the step of buffering the output of the processing.

29. A method according to claim 28, wherein the number of buffered output signals is proportional to the time for determining the decision.

30. A method according to claim 23, wherein the error is a mean square error or a number of consecutive ambiguous decisions.

31. A method according to claim 25, wherein the forward filter and the feedback filters are adaptive.

32. A method according to claim 27, wherein at least one parameter of the processing of the selected sequence is transferred to the processing of the other sequence.

33. A method of processing a sequence of digital symbols comprising the steps of:

processing the sequence of digital symbols in a single equalizer;

calculating an uncertainty; and continuing to process the sequence of digital symbols into a single output sequence if the uncertainty is below or equal a predefined threshold and if the uncertainty exceeds the predefined threshold performing the steps of:

activating at least a second equalizer thereby processing at least two output sequences of digital symbols each having at least one parameter different from the other;

calculating an error for each sequence; and deciding upon the calculated error which output sequence is used to generate an output signal.

34. A method according to claim 33, further comprising the steps of filtering the digital symbols through a forward filter prior to processing the sequence.

35. A method according to claim 34, wherein the step of processing the digital symbols comprises the steps of:

adding a feedback signal to the filtered signal;

applying the added signal to a slicer; and filtering the output signal of the slicer through a feedback filter to generate the feedback signal.

36. A method according to claim 35, wherein the slicer is a Viterbi detector.

37. A method according to claim 33, wherein the step of deciding which sequence is selected is activated by an error threshold.

38. A method according to claim 37, further comprising the step of buffering the output of the processing.

39. A method according to claim 38, wherein the number of buffered output signals is proportional to the time for determining the decision.

40. A method according to claim 33, wherein the error is a mean square error.

41. A method according to claim 33, wherein the error is calculated by the number of consecutive ambiguous decisions.

42. A method according to claim 35, wherein the forward filter and the feedback filters are adaptive.

* * * * *